US012719646B2

(12) United States Patent
Nam et al.

(10) Patent No.: US 12,719,646 B2
(45) Date of Patent: Aug. 25, 2026

(54) TECHNIQUES FOR CONFIGURING CONTROL CHANNEL MONITORING SKIP DURATIONS

(71) Applicant: QUALCOMM Incorporated, San Diego, CA (US)

(72) Inventors: Wooseok Nam, San Diego, CA (US); Ruhua He, San Diego, CA (US); Tao Luo, San Diego, CA (US); Hari Sankar, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 599 days.

(21) Appl. No.: 17/818,550

(22) Filed: Aug. 9, 2022

(65) Prior Publication Data

US 2023/0106999 A1 Apr. 6, 2023

Related U.S. Application Data

(60) Provisional application No. 63/261,969, filed on Oct. 1, 2021.

(51) Int. Cl.

*H04L 5/00* (2006.01)
*H04W 28/06* (2009.01)
*H04W 28/24* (2009.01)

(52) U.S. Cl.

CPC .......... *H04L 5/0064* (2013.01); *H04L 5/0053* (2013.01); *H04W 28/06* (2013.01); *H04W 28/24* (2013.01)

(58) Field of Classification Search

CPC ... H04L 5/0053; H04L 5/0064; H04L 5/0078; H04W 28/06; H04W 28/24
See application file for complete search history.

(56) References Cited

U.S. PATENT DOCUMENTS 12,041,611 B2 * 7/2024 Nam ................ H04W 52/0229
2019/0223164 A1 * 7/2019 He ........................ H04W 76/27
2020/0374036 A1 * 11/2020 Seo ...................... H04L 1/0038

(Continued)

FOREIGN PATENT DOCUMENTS

EP 4017135 A1 * 6/2022 ........... H04W 72/23
WO WO-2021068248 A1 4/2021

OTHER PUBLICATIONS

International Search Report and Written Opinion—PCT/US2022/076110—ISA/EPO—Nov. 23, 2022.

(Continued)

*Primary Examiner* — Thomas R Cairns
*Assistant Examiner* — Kai Chang
(74) *Attorney, Agent, or Firm* — Harrity & Harrity/Qualcomm Incorporated

(57) ABSTRACT

Various aspects of the present disclosure generally relate to wireless communication. In some aspects, a user equipment (UE) may receive an indication of a selection of a set of control channel monitoring skip durations, of multiple candidate sets of control channel monitoring skip durations. The UE may receive an indication of a control channel monitoring skip duration of the set of control channel monitoring skip durations. The UE may refrain from monitoring a (Continued)

400
Network Node
UE
405 Receive configuration information
410 Configure the UE
415 Transmit an indication of support for selection of a set of control channel monitoring skip durations for later selection of a control channel monitoring skip duration
420 Receive an indication of multiple candidate sets of control channel monitoring skip durations
425 Receive an indication a selection of a set of control channel monitoring skip durations of the multiple candidate sets of control channel monitoring skip durations
430 Receive an indication of a selection of a control channel monitoring skip duration of the set of control channel monitoring skip durations
435 Transmit an acknowledgment of the indication of the selection of the control channel monitoring skip duration
440 Refrain from monitoring the control channel
445 Resume monitoring the control channel
450 Revert to a previously-indicated set of control channel monitoring skip durations control channel during a time period associated with the control channel monitoring skip duration. Numerous other aspects are described.

30 Claims, 8 Drawing Sheets

(56) References Cited

U.S. PATENT DOCUMENTS

2021/0307108 A1* 9/2021 Babaei .................. H04W 76/28
2022/0053470 A1* 2/2022 Chen ..................... H04L 1/0061
2022/0322227 A1* 10/2022 Jacob Mathecken ........................ H04W 52/0219
2022/0361218 A1* 11/2022 He ........................ H04L 5/0053
2022/0369231 A1* 11/2022 Ma ...................... H04W 52/028
2023/0098013 A1* 3/2023 Ma ........................ H04W 24/08 370/329
2023/0119893 A1* 4/2023 Li ......................... H04W 24/08 370/329
2023/0156722 A1* 5/2023 Li ......................... H04W 72/23 370/329
2023/0189392 A1* 6/2023 Babaei .................. H04L 5/0055 370/329
2023/0199648 A1* 6/2023 Li ......................... H04W 24/08 370/311
2023/0199651 A1* 6/2023 Ohara ............... H04W 52/0229 370/252
2023/0362954 A1* 11/2023 Moon ............... H04W 72/0446
2024/0064754 A1* 2/2024 Ohara ................... H04L 5/0053
2024/0072973 A1* 2/2024 Niu ....................... H04L 5/0053
2024/0073915 A1* 2/2024 Zhou ..................... H04W 76/28

OTHER PUBLICATIONS

Moderator (Vivo) : "FL Summary#4 of DCI-Based Power Saving Adaptation", 3GPP TSG RAN WG1#106-e, R1-2108387, 3rd Generation Partnership Project (3GPP), Mobile Competence Centre, 650, Route Des Lucioles, F-06921 Sophia-Antipolis Cedex, France, vol. RAN WG1, No. E-Meeting, Aug. 16, 2021-Aug. 27, 2021, Aug. 25, 2021, XP052042598, 86 Pages, section 1 section 2.1.1 section 2.4 section 4 section 5.

* cited by examiner

Figure 4:
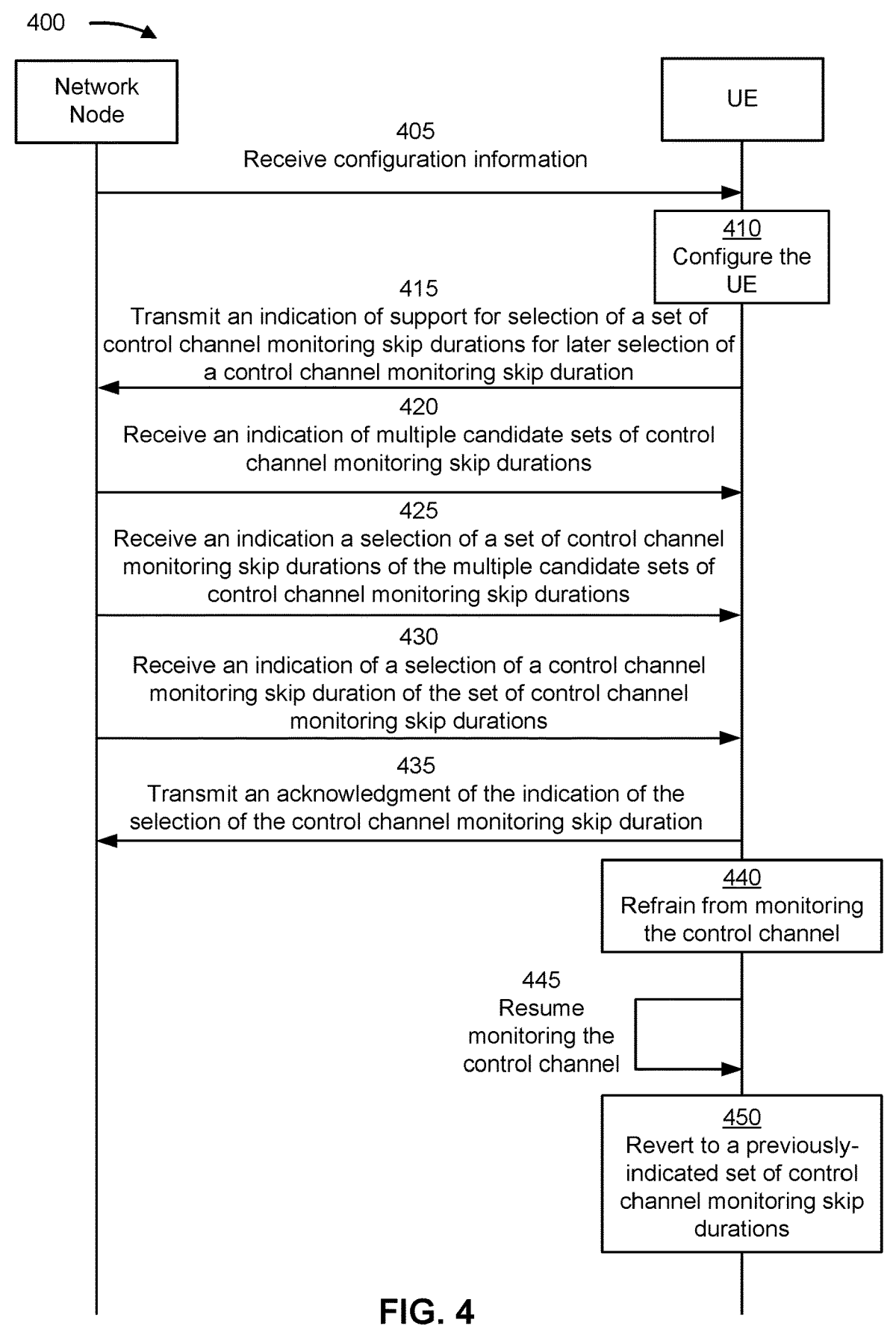

400

Network Node

UE

405
Receive configuration information

410
Configure the UE

415
Transmit an indication of support for selection of a set of control channel monitoring skip durations for later selection of a control channel monitoring skip duration 420
Receive an indication of multiple candidate sets of control channel monitoring skip durations 425
Receive an indication a selection of a set of control channel monitoring skip durations of the multiple candidate sets of control channel monitoring skip durations 430
Receive an indication of a selection of a control channel monitoring skip duration of the set of control channel monitoring skip durations 435
Transmit an acknowledgment of the indication of the selection of the control channel monitoring skip duration 440
Refrain from monitoring the control channel 445
Resume monitoring the control channel 450
Revert to a previously-indicated set of control channel monitoring skip durations

TECHNIQUES FOR CONFIGURING CONTROL CHANNEL MONITORING SKIP DURATIONS

CROSS-REFERENCE TO RELATED APPLICATION

This patent application claims priority to U.S. Provisional Patent Application No. 63/261,969, filed on Oct. 1, 2021, entitled "TECHNIQUES FOR CONFIGURING CONTROL CHANNEL MONITORING SKIP DURATIONS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for configuring control channel monitoring skip durations.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a user equipment (UE). The method may include receiving an indication of a selection of a set of control channel monitoring skip durations, of multiple candidate sets of control channel monitoring skip durations. The method may include receiving an indication of a control channel monitoring skip duration of the set of control channel monitoring skip durations. The method may include refraining from monitoring a control channel during a time period associated with the control channel monitoring skip duration.

Some aspects described herein relate to a method of wireless communication performed by a network node. The method may include transmitting, to a UE, an indication of a selection of a set of control channel monitoring skip durations, of multiple candidate sets of control channel monitoring skip durations. The method may include transmitting, to the UE, an indication of a control channel monitoring skip duration of the set of control channel monitoring skip durations.

Some aspects described herein relate to a UE for wireless communication. The user equipment may include a memory and one or more processors coupled to the memory. The one or more processors may be configured to receive an indication of a selection of a set of control channel monitoring skip durations, of multiple candidate sets of control channel monitoring skip durations. The one or more processors may be configured to receive an indication of a control channel monitoring skip duration of the set of control channel monitoring skip durations. The one or more processors may be configured to refrain from monitoring a control channel during a time period associated with the control channel monitoring skip duration.

Some aspects described herein relate to a network node for wireless communication. The network node may include a memory and one or more processors coupled to the memory. The one or more processors may be configured to transmit, to a UE, an indication of a selection of a set of control channel monitoring skip durations, of multiple candidate sets of control channel monitoring skip durations. The one or more processors may be configured to transmit, to the UE, an indication of a control channel monitoring skip duration of the set of control channel monitoring skip durations.

Some aspects described herein relate to a non-transitory computer-readable medium that stores a set of instructions for wireless communication by a UE. The set of instructions, when executed by one or more processors of the UE, may cause the UE to receive an indication of a selection of a set of control channel monitoring skip durations, of multiple candidate sets of control channel monitoring skip durations. The set of instructions, when executed by one or more processors of the UE, may cause the UE to receive an indication of a control channel monitoring skip duration of the set of control channel monitoring skip durations. The set of instructions, when executed by one or more processors of the UE, may cause the UE to refrain from monitoring a control channel during a time period associated with the control channel monitoring skip duration.

Some aspects described herein relate to a non-transitory computer-readable medium that stores a set of instructions for wireless communication by a network node. The set of instructions, when executed by one or more processors of the network node, may cause the network node to transmit, to a UE, an indication of a selection of a set of control channel monitoring skip durations, of multiple candidate sets of control channel monitoring skip durations. The set of instructions, when executed by one or more processors of the network node, may cause the network node to transmit, to the UE, an indication of a control channel monitoring skip duration of the set of control channel monitoring skip durations.

Some aspects described herein relate to an apparatus for wireless communication. The apparatus may include means for receiving an indication of a selection of a set of control channel monitoring skip durations, of multiple candidate sets of control channel monitoring skip durations. The apparatus may include means for receiving an indication of a control channel monitoring skip duration of the set of control channel monitoring skip durations. The apparatus may include means for refraining from monitoring a control channel during a time period associated with the control channel monitoring skip duration.

Some aspects described herein relate to an apparatus for wireless communication. The apparatus may include means for transmitting, to a UE, an indication of a selection of a set of control channel monitoring skip durations, of multiple candidate sets of control channel monitoring skip durations. The apparatus may include means for transmitting, to the UE, an indication of a control channel monitoring skip duration of the set of control channel monitoring skip durations.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example associated with techniques for configuring control channel monitoring skip durations, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
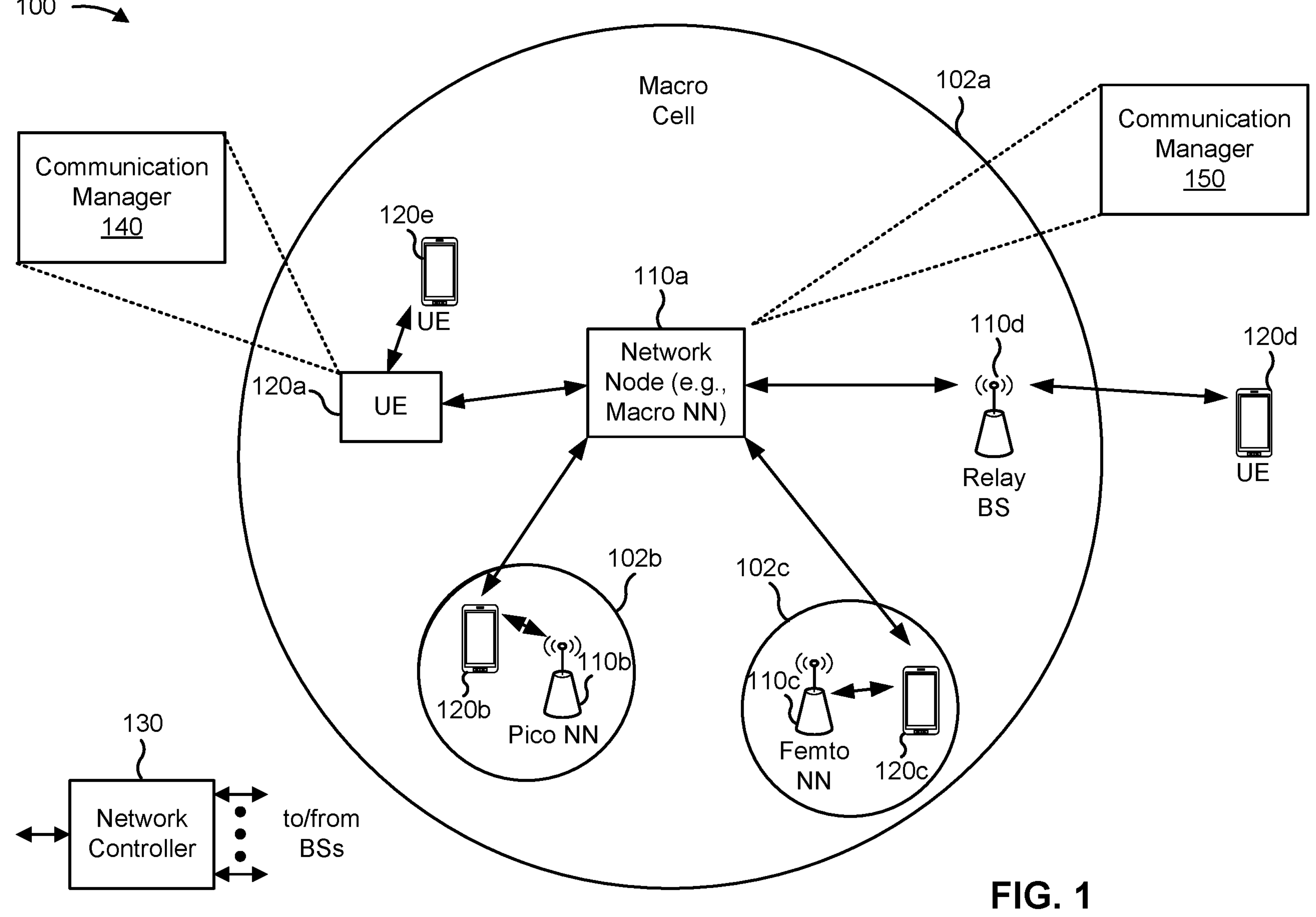
FIG. 1 is a diagram illustrating an example of a wireless network, in accordance with the present disclosure.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive an indication of a selection of a set of control channel monitoring skip durations, of multiple candidate sets of control channel monitoring skip durations; receive an indication of a control channel monitoring skip duration of the set of control channel monitoring skip durations; and refrain from monitoring a control channel during a time period associated with the control channel monitoring skip duration. Additionally, or alternatively, the communication manager 140 may perform one or more other operations described herein.

In some aspects, the network node 110 may include a communication manager 150. As described in more detail elsewhere herein, the communication manager 150 may transmit, to a UE, an indication of a selection of a set of control channel monitoring skip durations, of multiple candidate sets of control channel monitoring skip durations; and transmit, to the UE, an indication of a control channel monitoring skip duration of the set of control channel monitoring skip durations. Additionally, or alternatively, the communication manager 150 may perform one or more other operations described herein.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a network node, or a network equipment may be implemented in an aggregated or disaggregated architecture. For example, a network node (such as a Node B (NB), evolved NB (eNB), NR base station (BS), 5G NB, gNodeB (gNB), access point (AP), transmit receive point (TRP), or cell), or one or more units (or one or more components) performing network node functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more centralized units (CUs), one or more distributed units (DUs), one or more radio units RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

As indicated above, FIG. 1 is provided as an example. Other examples may differ from what is described with regard to FIG. 1.

Figure 2:
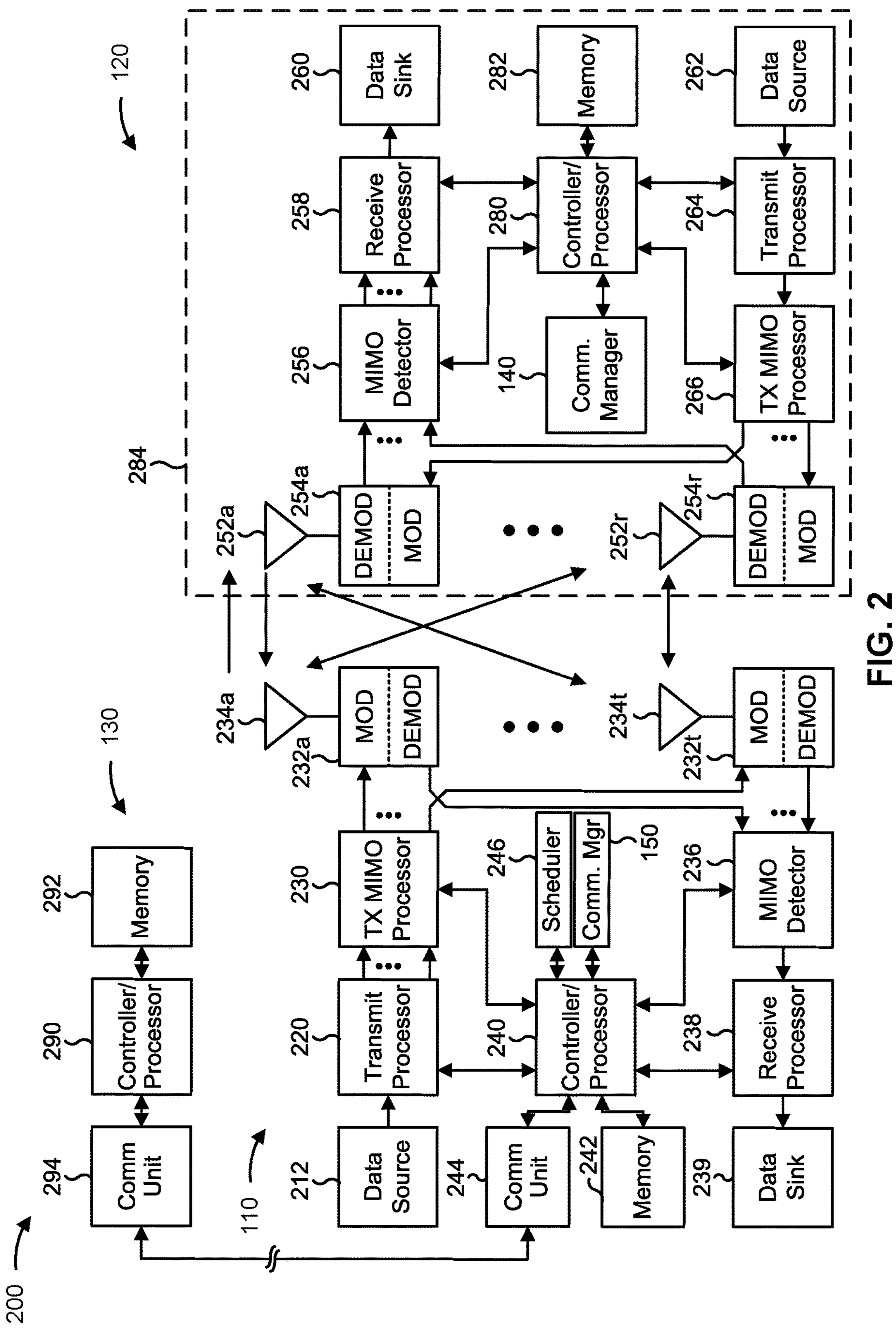
FIG. 2 is a diagram illustrating an example of a network node in communication with a user equipment (UE) in a wireless network, in accordance with the present disclosure.

FIG. 2 is a diagram illustrating an example 200 of a network node 110 in communication with a user equipment (UE) 120 in a wireless network 100. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the network node 110 or other network nodes 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 4-8).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 4-8).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with configuring control channel monitoring skip durations, as described in more detail elsewhere herein. For example, the controller/processor 240 of the network node 110, the controller/processor 280 of the UE 120, or any other component(s) (or combinations of components) of FIG. 2 may perform or direct operations of, for example, process 500 of FIG. 5, process 600 of FIG. 6, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE includes means for receiving an indication of a selection of a set of control channel monitoring skip durations, of multiple candidate sets of control channel monitoring skip durations; means for receiving an indication of a control channel monitoring skip duration of the set of control channel monitoring skip durations; and/or means for refraining from monitoring a control channel during a time period associated with the control channel monitoring skip duration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting, to a UE, an indication of a selection of a set of control channel monitoring skip durations, of multiple candidate sets of control channel monitoring skip durations; and/or means for transmitting, to the UE, an indication of a control channel monitoring skip duration of the set of control channel monitoring skip durations. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
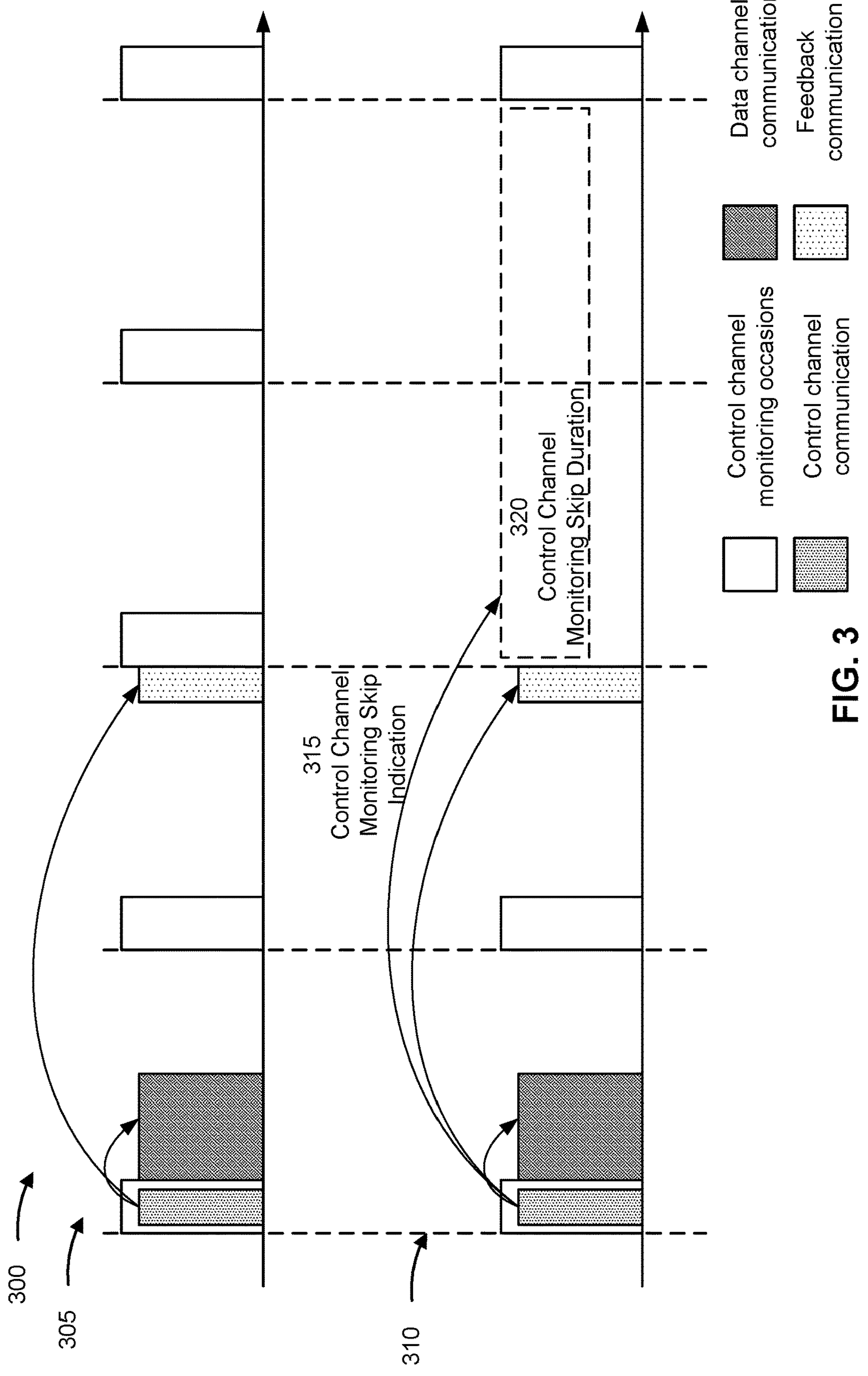
FIG. 3 is a diagram illustrating an example of control channel monitoring skipping, in accordance with the present disclosure.

FIG. 3 is a diagram illustrating an example of control channel monitoring skipping, in accordance with the present disclosure. A first device (e.g., a UE) may be configured with a set of control channel monitoring occasions (e.g., physical downlink control channel (PDCCH) monitoring occasions or physical sidelink control channel (PSCCH) monitoring occasions) during which the UE is to monitor for a control channel communication. For example, the first device be configured with the set of control channel monitoring occasions based at least in part in the first device being in a power saving mode, such as a discontinuous reception (DRX) mode.

As shown in example 305, the first device may monitor each of the control channel monitoring occasions. The first device may receive a control channel communication in a first control channel monitoring occasion. The control channel communication indicates resources for the first device to receive a data channel communication (e.g., a physical downlink shared channel (PDSCH) communication or physical sidelink shared channel (PSSCH) communication). The control channel communication may indicate resources for a feedback communication (e.g., a hybrid automatic repeat request (HARD) acknowledgment (HARQ-ACK) associated with the control channel communication and/or the data channel communication).

As shown in example 310, the first device may receive a control channel communication in a first control channel monitoring occasion. The control channel communication indicates resources for the first device to receive a data channel communication, resources for a feedback communication associated with the control channel communication and/or the data channel communication, and/or a control channel monitoring skip indication 315.

The control channel monitoring skip indication 315 indicates that the first device is to refrain from monitoring the control channel for an indicated duration of time. The first device may receive the control channel monitoring skip indication 315 via a control channel communication that schedules uplink or downlink data communications for the first device. For example, the control channel communication may include a field for indicating a control channel monitoring skip duration 320. The bit field may be limited in size based at least in part on, for example, a bit count limit imposed to constrain overhead from the control channel communication (e.g., a downlink control information (DCI) message). Based at least in part on the bit field being limited in size, the control channel communication may be able to indicate a limited number of candidate control channel monitoring skip durations. For example, a 2-bit indication with four values of the control channel communication field may be configured with 1, 2, 3, or 4 slots as the candidate control channel monitoring skip durations. However, different types of traffic have different periodicities, such as periodicities that are greater than 4 slots. In this case, to indicate a control channel monitoring skip duration that is, for example, 7 slots, the first device may be configured to monitor a control channel monitoring occasion after only 4 slots. The first device may then receive a control channel communication indicating an additional control channel monitoring skip duration, or the first device may be configured to monitor subsequent control channel monitoring occasions (e.g., if initiation of an additional control channel monitoring skipping requires too many slots to conserve power resources).

Based at least in part on the control channel communication having a limited number of candidate channel monitoring skip durations, the first device may unnecessarily consume power resources based at least in part on a reduction of power saving intended by using control channel monitoring skipping. Alternatively, if a field for indicating the control channel monitoring skip duration has additional bits to indicate additional candidate control channel monitoring skip durations, the control channel communication consumes communication and network resources.

As indicated above, FIG. 3 is provided as an example. Other examples may differ from what is described with regard to FIG. 3.

In some aspects described herein, a first device (e.g., a UE) may be configured with multiple candidate sets of control channel monitoring skip durations. The first device may receive, from a second device, an indication of a selection of a set of control channel monitoring skip durations of the multiple sets of control channel monitoring skip durations. The first device may then receive, from the second device, an indication of a control channel monitoring skip duration of the set of control channel monitoring skip durations. The first device may refrain from monitoring a control channel during a time period associated with the control channel monitoring skip duration.

Based at least in part on using a multi-part indication of the control channel monitoring skip durations, an indication of a control channel monitoring skip duration may be used to select from an increased number of candidate control channel monitoring skip durations. In this way, the control channel monitoring skip duration may be selected based at least in part on improving power reduction for the first device.

In some aspects, the control channel monitoring skip duration may be selected based at least in part on a type of communications expected for the first device. For example, virtual reality (VR) traffic, augmented reality (AR) traffic, and/or anything reality (XR) traffic, among other examples may be configured for a transmission to the first device with a periodicity that is based at least in part on a refresh rate of an application of the first device (e.g., 60 Hz, 120 Hz, among other examples). The first device may receive an indication of a set of control channel monitoring skip durations that is configured to be within a threshold time from an expected arrival time of the traffic.

In some aspects, the first device may receive an indication of multiple sets of control channel monitoring skip durations via a communication protocol, radio resource control (RRC) signaling, and/or medium access control (MAC) signaling. In some aspects, each set has a number of entries (e.g., a maximum number of entries) that is based at least in part on a size of a field of the control channel communication that is used to indicate the control channel monitoring skip duration. For example, each set may have 2^N entries, where N is a number of bits in the field of the control channel communication that is used to indicate the control channel monitoring skip duration. Each set may be unique and/or may have at least one control channel monitoring skip duration that is different from other sets. For example, a first set may include control channel monitoring skip durations of {1, 2, 3, 4}; a second set may include control channel monitoring skip durations of {4, 5, 6, 7}; and a third set may include a control channel monitoring skip durations of {2, 4, 6, 8}; among other examples.

The first device may receive an indication of a set of control channel monitoring skip durations to use via DCI (e.g., a new field in DCI or a new DCI format), MAC signaling, and/or a scheduling communication, among other examples. Additionally, or alternatively, the indication may be an implicit indication.

In some aspects, the implicit indication may be based at least in part on attributes of a scheduled data channel (e.g., indicated via a same scheduling DCI that indicates the control channel monitoring skip duration). For example, the attributes may include a HARQ process ID, a time resource allocation in a slot, a frequency resource allocation in the slot, a scheduling offset, and/or a transmit beamforming parameter (e.g., a transmission configuration information (TCI) state identification or a sounding reference signal (SRS) resource index, among other examples), among other examples. In an illustrative example, HARQ process identifications 0, 1, 2, 3 may correspond to a first set of control channel monitoring skip durations, HARQ process identifications 4, 5, 6, 7 may correspond to a second set of control channel monitoring skip durations, etc.

In some aspects, the implicit indication may be based at least in part on attributes of a scheduling control channel (e.g., the DCI that indicates the control channel monitoring skip duration). For example, the attributes may include a control resources set (CORESET), a search space set index, a first control channel element (CCE) index in a CORESET that is mapped to the scheduling control channel, a scrambling sequence, a DMRS configuration, radio network temporary identifier, and/or a cyclic redundancy check (CRC) of the scheduling control channel, among other examples.

In some aspects, a second device (e.g., a network node or another UE in a sidelink connection) may select the set of control channel monitoring skip durations based at least in part on traffic characteristics. For example, traffic with a relatively short average inter-arrival time, the second device may select a set with a relatively fine granularity and relatively small range. For traffic with a periodic arrival (e.g., XR traffic), a set with values condensed around the inter-arrival time (e.g., 16 milliseconds (ms) for XR traffic) may be used for jitter handling (e.g., {15, 15.5, 16, 16.5} ms).

Once indicated, the set of control channel monitoring skip durations may be valid for a period of time. For example, if the first device receives the indication of the set of control channel monitoring skip durations via one or more MAC control element (CE), the period of time may start at some time (e.g., 3 ms) after a HARQ-ACK feedback for the MAC CE. Additionally, or alternatively, if indicated by DCI, the period of time may start immediately, or may start after an application delay that is based at least in part on subcarrier spacing configured for communications between the first device and the second device.

The period of time may end after a pre-determined time, which may also be indicated along with the indication of the set of control channel monitoring skip durations. After expiration of the period of time, a default set of control channel monitoring skip durations may be activated. The default set may be indicated via a communication protocol, RRC signaling, or MAC signaling. The default set may be a static set, may be a previous set, and/or may depend on one or more parameters of a communication configuration (e.g., a bandwidth part, a subcarrier spacing, and/or a communication type, among other examples). Additionally, or alternatively, the period of time may terminate when the first device receives an additional indication of a set of control channel monitoring skip durations, and the new set of control channel monitoring skip durations is active.

FIG. 4 is a diagram illustrating an example associated with techniques for configuring control channel monitoring skip durations, in accordance with the present disclosure. As shown in FIG. 4, a network node (e.g., network node 110) may communicate with a UE (e.g., UE 120). In some aspects, the network node and the UE may be part of a wireless network (e.g., wireless network 100). The UE and the network node may have established a wireless connection prior to operations shown in FIG. 4. Although FIG. 4 is described in the context of communications between a UE and a network node, the techniques described here may be applied to communications between any first device and any second device, such as a first UE and a second UE in a sidelink communication or a devices in an industrial Internet of Things environment.

As shown by reference number 405, the network node may transmit, and the UE may receive, configuration information. In some aspects, the UE may receive the configuration information via one or more of RRC signaling, MAC CEs, or DCI, among other examples. In some aspects, the configuration information may include an indication of one or more configuration parameters (e.g., already known to the UE) for selection by the UE, or explicit configuration information for the UE to use to configure the UE, among other examples.

In some aspects, the configuration information may indicate that the UE is to use a set of control channel monitoring skip durations based at least in part on receiving an indication to use the set of control channel monitoring skip durations. In some aspects, the configuration information may indicate a size of a field within a control channel communication (e.g., a DCI message) that is used to indicate a control channel monitoring skip duration from a set of control channel monitoring skip durations. In some aspects, the configuration information may indicate when to initiate a control channel monitoring skip duration, when to terminate a control channel monitoring skip duration, and/or one or more metrics that may be used to determine when to initiate or terminate a control channel monitoring skip duration.

As shown by reference number 410, the UE may configure itself based at least in part on the configuration information. In some aspects, the UE may be configured to perform one or more operations described herein based at least in part on the configuration information.

As shown by reference number 415, the UE may transmit, and the network node may receive, an indication of support for selection of a set of control channel monitoring skip durations for later selection of a control channel monitoring skip duration. For example, the UE may transmit an indication of support for a number of sets of control channel monitoring skip durations that may be selected by the network node and/or support for dynamic or semi-static selections of sets of control channel monitoring skip durations, among other examples.

As shown by reference number 420, the UE may receive, and the network node may transmit, an indication of multiple sets of control channel monitoring skip durations. In some aspects, the UE may receive the indication of the multiple candidate sets of control channel monitoring skip durations via RRC signaling or MAC signaling, among other examples. In some aspects, the UE may receive the indication of the multiple candidate sets of control channel monitoring skip durations via configuration information (e.g., as described in connection with reference number 405). In some aspects, the indication of the multiple sets of control channel monitoring skip durations may be implicit based at least in part on, for example, one or more parameters associated with a communication link between the UE and the network node.

In some aspects, a number (e.g., a maximum number) of control channel monitoring skip durations within sets of the multiple sets of control channel monitoring skip durations is based at least in part on a size of a field associated with the indication of the control channel monitoring skip duration. For example, number may be equal to, or less than, a number of unique values that may be indicated in the field associated with the indication of the control channel monitoring skip duration.

In some aspects, a first set of control channel monitoring skip durations, of the multiple candidate sets of control channel monitoring skip durations, includes at least one control channel monitoring skip duration that is not within a set of control channel monitoring skip durations of a second set of control channel monitoring skip durations. For example, each set may be unique and/or may be mutually exclusive.

In some aspects, the UE may transmit an indication of a preferred configuration of the multiple candidate sets of control channel monitoring skip durations. For example, the UE may transmit the indication of the preferred configuration and the network node may transmit the indication of the multiple sets of the control channel monitoring skip durations based at least in part on the preferred configuration. The preferred configuration may indicate each of the multiple sets indicated by the network node, some of the multiple sets indicated by the network node, or none of the multiple sets indicated by the network node. In some aspects, the preferred configuration may provide one or more parameters for the network node to use for selecting the multiple candidate sets and/or an explicit indication of sets of the control channel monitoring skip durations that are preferred, among other examples. In some aspects, the UE may transmit the indication of the preferred configuration via UE assistance information, MAC signaling, and/or uplink control information, among other examples As shown by reference number 425, the UE may receive, and the network node may transmit, an indication of a selection of a set of control channel monitoring skip durations of the multiple candidate sets of control channel monitoring skip durations. In some aspects, the UE may receive the indication of the selection of the set of control channel monitoring skip durations via dynamic signaling, such as DCI or MAC signaling.

In some aspects, the network node may select the set of control channel monitoring skip durations based at least in part on traffic characteristics associated with communication between the UE and the network node. For example, traffic having an average inter-arrival time that satisfies a first threshold may be associated with a set of control channel monitoring skip durations having a first range of control channel monitoring skip durations, and traffic having an average inter-arrival time that fails to satisfy the first threshold may be associated with a set of control channel monitoring skip durations having a second range of control channel monitoring skip durations that is less than the first range of control channel monitoring skip durations. In some aspects, traffic having a periodic arrival time (e.g., XR traffic) may be associated with a set of control channel monitoring skip durations configured to end within a timing threshold from a next periodic arrival time occasion.

In some aspects, the indication of the selection of the set of control channel monitoring skip durations applies to subsequent indications of control channel monitoring skip durations within a time window. For example, the indication of the selection of the set of control channel monitoring skip durations applies to a set of subsequent indications of control channel monitoring skip durations based at least in part on reception of the one or more subsequent indications of control channel monitoring skip durations during a time window. In some aspects, the indication of the selection of the set of control channel monitoring skip durations applies to subsequent indications of control channel monitoring skip durations until receiving an indication to use a different set of control channel monitoring skip durations. For example, the indication of the selection of the set of control channel monitoring skip durations applies to subsequent indications of control channel monitoring skip durations based at least in part on receiving the set of subsequent indications of control channel monitoring skip durations before receiving (e.g., without first receiving) an indication of an update to the selection of the set of control channel monitoring skip durations.

The time window may begin when the network node transmits the indication of the selection, when the UE transmits an acknowledgment of the indication, or at another time. In some aspects, the time window may begin at beginning time that is based at least in part on a message type associated with the indication of the selection of the set of control channel monitoring skip durations. In some aspects, the beginning time is based at least in part on a delay that is based at least in part on a sub-carrier spacing associated with the control channel. In some aspects, the beginning time is based at least in part on a HARQ-ACK feedback associated with the indication of the selection of the set of control channel monitoring skip durations.

The time window may end at a time that is based at least in part on a configured (e.g., via RRC signaling or via a communication protocol, among other examples) duration of the time. In some aspects, the time window may end at a time that is based at least in part on the indication of the selection of the set of control channel monitoring skip durations (e.g., as described in connection with reference number 425). For example, the time window may end at a time indicated within a same message as the indication of the selection of the set of control channel monitoring skip durations. In some aspects, the time window may end at a time that is based at least in part on an indication of the multiple candidate sets of control channel monitoring skip durations (e.g., as described in connection with reference number 420) and/or based at least in part on configuration information (e.g., as described in connection with reference number 405).

The indication of the selection may include an explicit indication and/or an implicit indication. In some aspects, an implicit indication may include one or more parameters of the scheduled data channel (e.g., scheduled with a same control channel message that includes an indication of a selection of a control channel monitoring skip duration) or the scheduling control channel (e.g., the same control channel that includes the indication of the selection of the control channel monitoring skip duration), among other examples. For example, the one or more parameters of the scheduled data channel may include a HARQ process identification, a time resource allocation, a frequency resource allocation, a scheduling offset, and/or a beamforming configuration. In some aspects, the implicit indication may be based at least in part on a single parameters or may be based at least in part on a combination of parameters.

In some aspects, the one or more parameters of the scheduling control channel may include a CORESET associated with the same control channel communication message that includes the indication of the selection of the control channel monitoring skip duration, a search space set index, and/or a first control channel element index in the CORESET that is mapped to the scheduling control channel. Additionally, or alternatively, the one or more parameters of the scheduling control channel may include a scrambling sequence of the scheduling control channel, and/or a DMRS (e.g., a DMRS pattern and/or a DMRS configuration) associated with the scheduling control channel. In some aspects, the one or more parameters of the scheduling control channel may include a radio network temporary identifier associated with the scheduling control channel or a cyclic redundancy check associated with the scheduling control channel, among other examples.

In some aspects, the UE may transmit an indication of a preferred set of the multiple candidate sets of control channel monitoring skip durations. For example, the UE may transmit the indication of the preferred set and the network node may transmit the indication of the set of the control channel monitoring skip durations based at least in part on the preferred set. In some aspects, the preferred set may provide one or more parameters for the network node to use for selecting the set and/or an explicit indication of the set that is preferred, among other examples. In some aspects, the UE may transmit the indication of the preferred set via UE assistance information, MAC signaling, and/or uplink control information, among other examples.

As shown by reference number 430, the UE may receive, and the network node may transmit, an indication of a selection of a control channel monitoring skip duration of the set of control channel monitoring skip durations. In some aspects, the UE may receive the indication of the selection of the control channel monitoring skip duration via dynamic signaling, such as a DCI message or MAC signaling. In some aspects, the dynamic signaling may include an indication of an allocation of resources for the data channel (e.g., a PDSCH or a physical uplink shared channel (PUSCH)).

As shown by reference number 435, the UE may transmit, and the network node may receive, an acknowledgment (e.g., HARQ-ACK) of the selection of the control channel monitoring skip duration. For example, the UE may transmit the acknowledgment via resources allocated via a same message that includes the indication of the selection of the control channel monitoring skip duration.

As shown by reference number 440, the UE may refrain from monitoring the control channel. In some aspects, the UE may remain in a low power mode (e.g., a DRX mode) instead of waking up during monitoring occasions during the time window. In some aspects, the time window may be indicated in a communication protocol, in RRC signaling, and/or in MAC signaling, among other examples.

As shown by reference number 445, the UE may resume monitoring the control channel. In some aspects, the UE may resume monitoring the control channel after termination of a control channel monitoring skip duration as indicated by the network node.

As shown by reference number 450, the UE may revert to a previously-indicated set of control channel monitoring skip durations. For example, the UE may activate a previously-indicated set of control channel monitoring skip durations upon expiration of a time window during which the indication of the selection of the set of control channel monitoring skip durations applies. The previously-indicated set of control channel monitoring skip durations may be indicated via DCI, RRC signaling, and/or MAC signaling, among other examples. For example, the previously-indicated set of control channel monitoring skip durations may be indicated within the configuration information described in connection with reference number 405, the indication of the multiple candidate sets of control channel monitoring skip durations described in connection with reference number 420, and/or the indication of the selection of the set of control channel monitoring skip durations described in connection with reference number 425.

Based at least in part on first using the indication of the selection of the set of control channel monitoring skip durations, an indication of a control channel monitoring skip duration may be used to select from an increased number of candidate control channel monitoring skip durations. In this way, the control channel monitoring skip duration may conserve power resources of the UE.

As indicated above, FIG. 4 is provided as an example. Other examples may differ from what is described with regard to FIG. 4.

Figure 5:
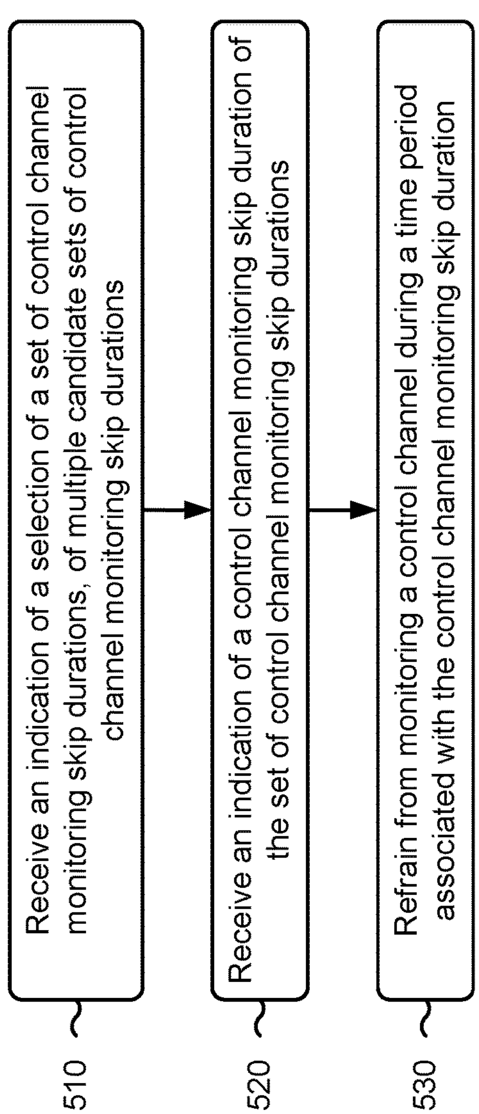
FIGS. 5 and 6 are diagrams illustrating example processes associated with configuring control channel monitoring skip durations, in accordance with the present disclosure.

FIG. 5 is a diagram illustrating an example process 500 performed, for example, by a UE, in accordance with the present disclosure. Example process 500 is an example where the UE (e.g., UE 120) performs operations associated with techniques for configuring control channel monitoring skip durations.

As shown in FIG. 5, in some aspects, process 500 may include receiving an indication of a selection of a set of control channel monitoring skip durations, of multiple candidate sets of control channel monitoring skip durations (block 510). For example, the UE (e.g., using communication manager 140 and/or reception component 702, depicted in FIG. 7) may receive an indication of a selection of a set of control channel monitoring skip durations, of multiple candidate sets of control channel monitoring skip durations, as described above.

As further shown in FIG. 5, in some aspects, process 500 may include receiving an indication of a control channel monitoring skip duration of the set of control channel monitoring skip durations (block 520). For example, the UE (e.g., using communication manager 140 and/or reception component 702, depicted in FIG. 7) may receive an indication of a control channel monitoring skip duration of the set of control channel monitoring skip durations, as described above.

As further shown in FIG. 5, in some aspects, process 500 may include refraining from monitoring a control channel during a time period associated with the control channel monitoring skip duration (block 530). For example, the UE (e.g., using communication manager 140 and/or communication manager 708, depicted in FIG. 7) may refrain from monitoring a control channel during a time period associated with the control channel monitoring skip duration, as described above.

Process 500 may include additional aspects, such as any single aspect or any combination of aspects described below and/or in connection with one or more other processes described elsewhere herein.

In a first aspect, a number (e.g., a maximum number) of control channel monitoring skip durations within the set of control channel monitoring skip durations is based at least in part on a size of a field associated with the indication of the control channel monitoring skip duration, or wherein the size of the field associated with the indication of the control channel monitoring skip duration is based at least in part on the number of control channel monitoring skip durations within the set of control channel monitoring skip durations.

In a second aspect, alone or in combination with the first aspect, an additional set of control channel monitoring skip durations, of the multiple candidate sets of control channel monitoring skip durations, includes at least one control channel monitoring skip duration that is not within the set of control channel monitoring skip durations.

In a third aspect, alone or in combination with one or more of the first and second aspects, process 500 includes receiving, before receiving the indication of the selection of the set of control channel monitoring skip durations, an indication of the multiple candidate sets of control channel monitoring skip durations.

In a fourth aspect, alone or in combination with one or more of the first through third aspects, reception of the indication of the multiple candidate sets of control channel monitoring skip durations comprises receiving the indication of the multiple candidate sets of control channel monitoring skip durations via one or more of RRC signaling or MAC signaling.

In a fifth aspect, alone or in combination with one or more of the first through fourth aspects, reception of the indication of the selection of the set of control channel monitoring skip durations comprises receiving the indication of the selection of the set of control channel monitoring skip durations via one or more of downlink control information or MAC signaling.

In a sixth aspect, alone or in combination with one or more of the first through fifth aspects, the selection of the set of control channel monitoring skip durations is based at least in part on traffic characteristics associated with communication between the UE and a network node.

In a seventh aspect, alone or in combination with one or more of the first through sixth aspects, traffic having an average inter-arrival time that satisfies a first threshold is associated with a set of control channel monitoring skip durations having a first range of control channel monitoring skip durations, and wherein traffic having an average inter-arrival time that fails to satisfy the first threshold is associated with a set of control channel monitoring skip durations having a second range of control channel monitoring skip durations that is less than the first range of control channel monitoring skip durations.

In an eighth aspect, alone or in combination with one or more of the first through seventh aspects, traffic having a periodic arrival time is associated with a set of control channel monitoring skip durations configured to end within a timing threshold from a next periodic arrival time occasion.

In a ninth aspect, alone or in combination with one or more of the first through eighth aspects, the indication of the selection of the set of control channel monitoring skip durations applies to one or more subsequent indications of control channel monitoring skip durations based at least in part on one or more of reception of the one or more subsequent indications of control channel monitoring skip durations during a time window, or reception of the one or more subsequent indications of control channel monitoring skip durations before receiving an indication of an update to the selection of the set of control channel monitoring skip durations.

In a tenth aspect, alone or in combination with one or more of the first through ninth aspects, a time window during which the indication of the selection of the set of control channel monitoring skip durations applies comprises one or more of a first beginning time that is based at least in part on a message type associated with the indication of the selection of the set of control channel monitoring skip durations, a second beginning time that is based at least in part on a delay that is based at least in part on a sub-carrier spacing associated with the control channel, a third beginning time that is based at least in part on a hybrid automatic repeat request acknowledgment feedback associated with the indication of the selection of the set of control channel monitoring skip durations, a first end time that is based at least in part on a configured duration of the time window, a second end time that is based at least in part on the indication of the selection of the set of control channel monitoring skip durations, or a third end time that is based at least in part on an indication of the multiple candidate sets of control channel monitoring skip durations.

In an eleventh aspect, alone or in combination with one or more of the first through tenth aspects, the UE activates a previously-indicated set of control channel monitoring skip durations upon expiration of a time window during which the indication of the selection of the set of control channel monitoring skip durations applies.

In a twelfth aspect, alone or in combination with one or more of the first through eleventh aspects, the indication of the selection comprises an explicit indication, or an implicit indication.

In a thirteenth aspect, alone or in combination with one or more of the first through twelfth aspects, the implicit indication is based at least in part on one or more of one or more parameters of a scheduled data channel, or one or more parameters of a scheduling control channel.

In a fourteenth aspect, alone or in combination with one or more of the first through thirteenth aspects, the one or more parameters of the scheduled data channel comprise one or more of a hybrid automatic repeat request process identification, a time resource allocation, a frequency resource allocation, a scheduling offset, or a beamforming configuration.

In a fifteenth aspect, alone or in combination with one or more of the first through fourteenth aspects, the one or more parameters of the scheduling control channel comprise one or more of a CORESET, a search space set index, a first control channel element index in the CORESET that is mapped to the scheduling control channel, a scrambling sequence of the scheduling control channel, a demodulation reference signal associated with the scheduling control channel, a radio network temporary identification associated with the scheduling control channel, or a cyclic redundancy check associated with the scheduling control channel.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
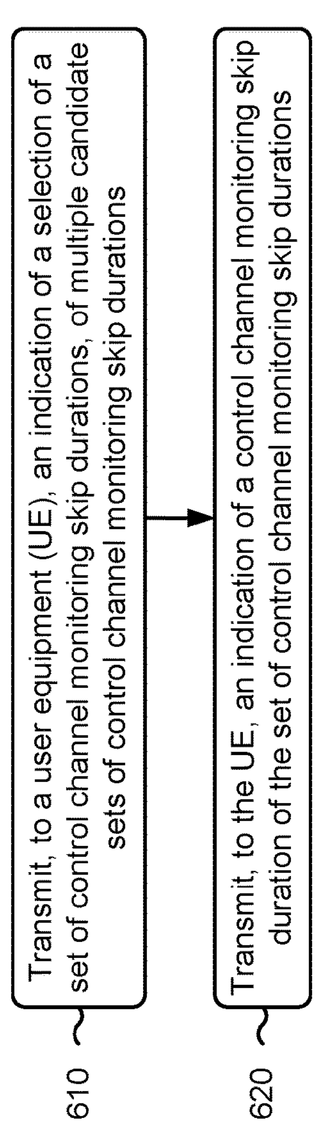

FIG. 6 is a diagram illustrating an example process 600 performed, for example, by a network node, in accordance with the present disclosure. Example process 600 is an example where the network node (e.g., network node 110) performs operations associated with techniques for configuring control channel monitoring skip durations.

As shown in FIG. 6, in some aspects, process 600 may include transmitting, to a UE, an indication of a selection of a set of control channel monitoring skip durations, of multiple candidate sets of control channel monitoring skip durations (block 610). For example, the network node (e.g., using communication manager 150 and/or transmission component 804, depicted in FIG. 8) may transmit, to a UE, an indication of a selection of a set of control channel monitoring skip durations, of multiple candidate sets of control channel monitoring skip durations, as described above.

As further shown in FIG. 6, in some aspects, process 600 may include transmitting, to the UE, an indication of a control channel monitoring skip duration of the set of control channel monitoring skip durations (block 620). For example, the network node (e.g., using communication manager 150 and/or transmission component 804, depicted in FIG. 8) may transmit, to the UE, an indication of a control channel monitoring skip duration of the set of control channel monitoring skip durations, as described above.

Process 600 may include additional aspects, such as any single aspect or any combination of aspects described below and/or in connection with one or more other processes described elsewhere herein.

In a first aspect, process 600 includes refraining from transmitting a control channel communication during a time period associated with the control channel monitoring skip duration.

In a second aspect, alone or in combination with the first aspect, a number of control channel monitoring skip durations within the set of control channel monitoring skip durations is based at least in part on a size of a field associated with the indication of the control channel monitoring skip duration, or wherein the size of the field associated with the indication of the control channel monitoring skip duration is based at least in part on the number of control channel monitoring skip durations within the set of control channel monitoring skip durations.

In a third aspect, alone or in combination with one or more of the first and second aspects, an additional set of control channel monitoring skip durations, of the multiple candidate sets of control channel monitoring skip durations, includes at least one control channel monitoring skip duration that is not within the set of control channel monitoring skip durations.

In a fourth aspect, alone or in combination with one or more of the first through third aspects, process 600 includes transmitting, before transmitting the indication of the selection of the set of control channel monitoring skip durations, an indication of the multiple candidate sets of control channel monitoring skip durations.

In a fifth aspect, alone or in combination with one or more of the first through fourth aspects, transmission of the indication of the multiple candidate sets of control channel monitoring skip durations comprises transmitting the indication of the multiple candidate sets of control channel monitoring skip durations via one or more of RRC signaling or MAC signaling.

In a sixth aspect, alone or in combination with one or more of the first through fifth aspects, transmission of the indication of the selection of the set of control channel monitoring skip durations comprises transmitting the indication of the selection of the set of control channel monitoring skip durations via one or more of downlink control information or MAC signaling.

In a seventh aspect, alone or in combination with one or more of the first through sixth aspects, the selection of the set of control channel monitoring skip durations is based at least in part on traffic characteristics associated with communication between the network node and the UE.

In an eighth aspect, alone or in combination with one or more of the first through seventh aspects, traffic having an average inter-arrival time that satisfies a first threshold is associated with a set of control channel monitoring skip durations having a first range of control channel monitoring skip durations, and wherein traffic having an average inter-arrival time that fails to satisfy the first threshold is associated with a set of control channel monitoring skip durations having a second range of control channel monitoring skip durations that is less than the first range of control channel monitoring skip durations.

In a ninth aspect, alone or in combination with one or more of the first through eighth aspects, traffic having a periodic arrival time is associated with a set of control channel monitoring skip durations configured to end within a timing threshold from a next periodic arrival time occasion.

In a tenth aspect, alone or in combination with one or more of the first through ninth aspects, the indication of the selection of the set of control channel monitoring skip durations applies to one or more subsequent indications of control channel monitoring skip durations based at least in part on one or more of transmission of the one or more subsequent indications of control channel monitoring skip durations during a time window, or transmission of the one or more subsequent indications of control channel monitoring skip durations before transmitting an indication of an update to the selection of the set of control channel monitoring skip durations.

In an eleventh aspect, alone or in combination with one or more of the first through tenth aspects, a time window during which the indication of the selection of the set of control channel monitoring skip durations applies comprises one or more of a first beginning time that is based at least in part on a message type associated with the indication of the selection of the set of control channel monitoring skip durations, a second beginning time that is based at least in part on a delay that is based at least in part on a sub-carrier spacing associated with the control channel, a third beginning time that is based at least in part on a hybrid automatic repeat request acknowledgment feedback associated with the indication of the selection of the set of control channel monitoring skip durations, a first end time that is based at least in part on a configured duration of the time window, a second end time that is based at least in part on the indication of the selection of the set of control channel monitoring skip durations, or a third end time that is based at least in part on an indication of the multiple candidate sets of control channel monitoring skip durations.

In a twelfth aspect, alone or in combination with one or more of the first through eleventh aspects, the network node activates a previously-indicated set of control channel monitoring skip durations upon expiration of a time window during which the indication of the selection of the set of control channel monitoring skip durations applies.

In a thirteenth aspect, alone or in combination with one or more of the first through twelfth aspects, the indication of the selection comprises an explicit indication, or an implicit indication.

In a fourteenth aspect, alone or in combination with one or more of the first through thirteenth aspects, the implicit indication is based at least in part on one or more of one or more parameters of a scheduled data channel, or one or more parameters of a scheduling control channel.

In a fifteenth aspect, alone or in combination with one or more of the first through fourteenth aspects, the one or more parameters of the scheduled data channel comprise one or more of a hybrid automatic repeat request process identification, a time resource allocation, a frequency resource allocation, a scheduling offset, or a beamforming configuration.

In a sixteenth aspect, alone or in combination with one or more of the first through fifteenth aspects, the one or more parameters of the scheduling control channel comprise one or more of a CORESET, a search space set index, a first control channel element index in the CORESET that is mapped to the scheduling control channel, a scrambling sequence of the scheduling control channel, a demodulation reference signal associated with the scheduling control channel, a radio network temporary identification associated with the scheduling control channel, or a cyclic redundancy check associated with the scheduling control channel.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
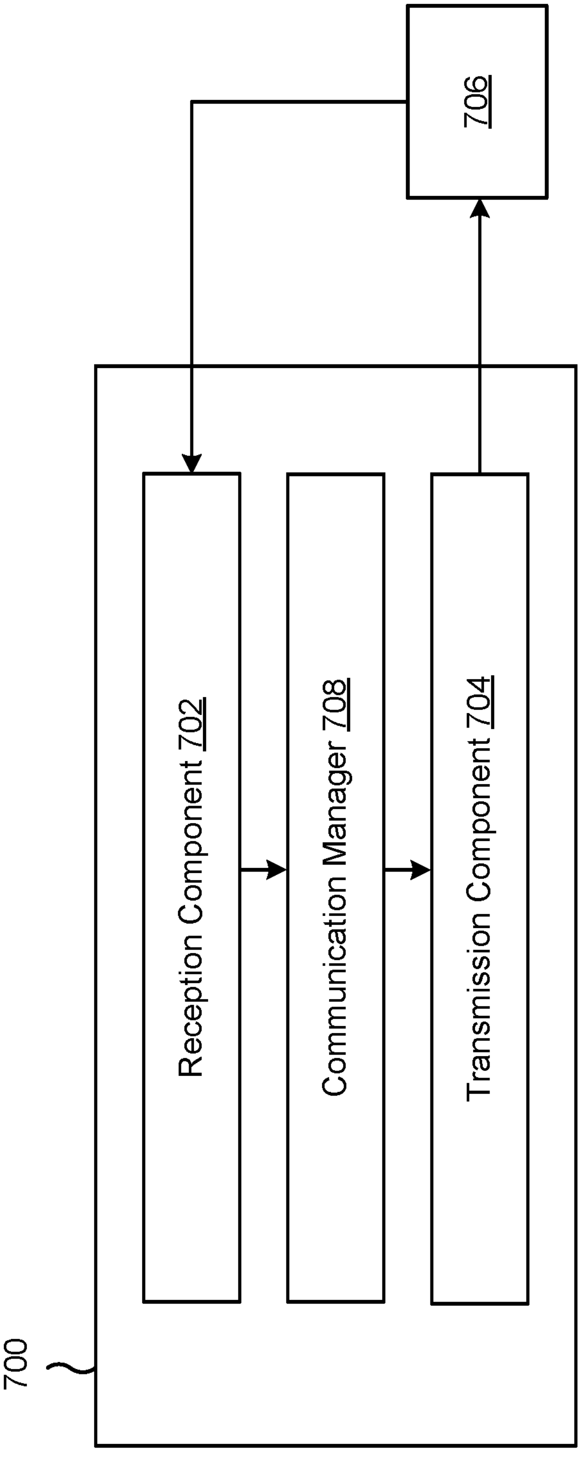
FIGS. 7 and 8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a network node, or another wireless communication device) using the reception component 702 and the transmission component 704. As further shown, the apparatus 700 may include a communication manager 708 (e.g., the communication manager 140).

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive an indication of a selection of a set of control channel monitoring skip durations, of multiple candidate sets of control channel monitoring skip durations. The reception component 702 may receive an indication of a control channel monitoring skip duration of the set of control channel monitoring skip durations. The communication manager 708 may refrain from monitoring a control channel during a time period associated with the control channel monitoring skip duration.

The reception component 702 may receive, before receiving the indication of the selection of the set of control channel monitoring skip durations, an indication of the multiple candidate sets of control channel monitoring skip durations.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
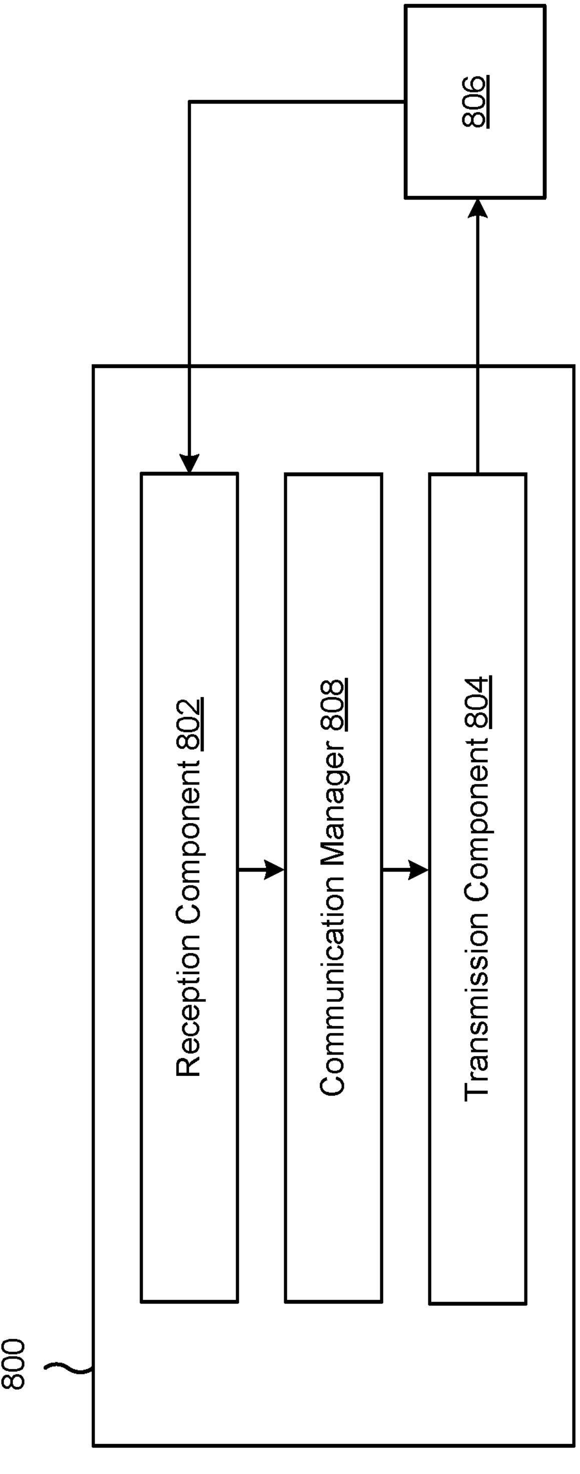

FIG. 8 is a diagram of an example apparatus 800 for wireless communication. The apparatus 800 may be a network node, or a network node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a network node, or another wireless communication device) using the reception component 802 and the transmission component 804. As further shown, the apparatus 800 may include a communication manager 808 (e.g., the communication manager 150).

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the network node described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the network node described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the network node described in connection with FIG. 2. In some aspects, the transmission component 804 may be co-located with the reception component 802 in a transceiver.

The transmission component 804 may transmit, to a UE, an indication of a selection of a set of control channel monitoring skip durations, of multiple candidate sets of control channel monitoring skip durations. The transmission component 804 may transmit, to the UE, an indication of a control channel monitoring skip duration of the set of control channel monitoring skip durations.

The communication manager 808 may refrain from transmitting a control channel communication during a time period associated with the control channel monitoring skip duration.

The transmission component 804 may transmit, before transmitting the indication of the selection of the set of control channel monitoring skip durations, an indication of the multiple candidate sets of control channel monitoring skip durations.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a UE, comprising: receiving an indication of a selection of a set of control channel monitoring skip durations, of multiple candidate sets of control channel monitoring skip durations; receiving an indication of a control channel monitoring skip duration of the set of control channel monitoring skip durations; and refraining from monitoring a control channel during a time period associated with the control channel monitoring skip duration.

Aspect 2: The method of Aspect 1, wherein a number of control channel monitoring skip durations within the set of control channel monitoring skip durations is based at least in part on a size of a field associated with the indication of the control channel monitoring skip duration, or wherein the size of the field associated with the indication of the control channel monitoring skip duration is based at least in part on the number of control channel monitoring skip durations within the set of control channel monitoring skip durations.

Aspect 3: The method of any of Aspects 1-2, wherein an additional set of control channel monitoring skip durations, of the multiple candidate sets of control channel monitoring skip durations, includes at least one control channel monitoring skip duration that is not within the set of control channel monitoring skip durations.

Aspect 4: The method of any of Aspects 1-3, further comprising: receiving, before receiving the indication of the selection of the set of control channel monitoring skip durations, an indication of the multiple candidate sets of control channel monitoring skip durations.

Aspect 5: The method of Aspect 4, wherein reception of the indication of the multiple candidate sets of control channel monitoring skip durations comprises: receiving the indication of the multiple candidate sets of control channel monitoring skip durations via one or more of radio resource control signaling or medium access control signaling.

Aspect 6: The method of any of Aspects 1-5, wherein reception of the indication of the selection of the set of control channel monitoring skip durations comprises: receiving the indication of the selection of the set of control channel monitoring skip durations via one or more of downlink control information or medium access control signaling.

Aspect 7: The method of any of Aspects 1-6, wherein the selection of the set of control channel monitoring skip durations is based at least in part on traffic characteristics associated with communication between the UE and a network node.

Aspect 8: The method of Aspect 7, wherein traffic having an average inter-arrival time that satisfies a first threshold is associated with a set of control channel monitoring skip durations having a first range of control channel monitoring skip durations, and wherein traffic having an average inter-arrival time that fails to satisfy the first threshold is associated with a set of control channel monitoring skip durations having a second range of control channel monitoring skip durations that is less than the first range of control channel monitoring skip durations.

Aspect 9: The method of any of Aspects 7-8, wherein traffic having a periodic arrival time is associated with a set of control channel monitoring skip durations configured to end within a timing threshold from a next periodic arrival time occasion.

Aspect 10: The method of any of Aspects 1-9, wherein the indication of the selection of the set of control channel monitoring skip durations applies to one or more subsequent indications of control channel monitoring skip durations based at least in part on one or more of: reception of the one or more subsequent indications of control channel monitoring skip durations during a time window, or reception of the one or more subsequent indications of control channel monitoring skip durations before receiving an indication of an update to the selection of the set of control channel monitoring skip durations.

Aspect 11: The method of any of Aspects 1-10, wherein a time window during which the indication of the selection of the set of control channel monitoring skip durations applies comprises one or more of: a first beginning time that is based at least in part on a message type associated with the indication of the selection of the set of control channel monitoring skip durations, a second beginning time that is based at least in part on a delay that is based at least in part on a sub-carrier spacing associated with the control channel, a third beginning time that is based at least in part on a hybrid automatic repeat request acknowledgment feedback associated with the indication of the selection of the set of control channel monitoring skip durations, a first end time that is based at least in part on a configured duration of the time window, a second end time that is based at least in part on the indication of the selection of the set of control channel monitoring skip durations, or a third end time that is based at least in part on an indication of the multiple candidate sets of control channel monitoring skip durations.

Aspect 12: The method of any of Aspects 1-11, wherein the UE activates a previously-indicated set of control channel monitoring skip durations upon expiration of a time window during which the indication of the selection of the set of control channel monitoring skip durations applies.

Aspect 13: The method of any of Aspects 1-12, wherein the indication of the selection comprises: an explicit indication, or an implicit indication.

Aspect 14: The method of Aspect 13, wherein the implicit indication is based at least in part on one or more of: one or more parameters of a scheduled data channel, or one or more parameters of a scheduling control channel.

Aspect 15: The method of Aspect 14, wherein the one or more parameters of the scheduled data channel comprise one or more of: a hybrid automatic repeat request process identification, a time resource allocation, a frequency resource allocation, a scheduling offset, or a beamforming configuration.

Aspect 16: The method of any of Aspects 14-15, wherein the one or more parameters of the scheduling control channel comprise one or more of: a control resource set (CORESET), a search space set index, a first control channel element index in the CORESET that is mapped to the scheduling control channel, a scrambling sequence of the scheduling control channel, a demodulation reference signal associated with the scheduling control channel, a radio network temporary identification associated with the scheduling control channel, or a cyclic redundancy check associated with the scheduling control channel.

Aspect 17: A method of wireless communication performed by a network node, comprising: transmitting, to a user equipment (UE), an indication of a selection of a set of control channel monitoring skip durations, of multiple candidate sets of control channel monitoring skip durations; and transmitting, to the UE, an indication of a control channel monitoring skip duration of the set of control channel monitoring skip durations.

Aspect 18: The method of Aspect 17, further comprising: refraining from transmitting a control channel communication during a time period associated with the control channel monitoring skip duration.

Aspect 19: The method of any of Aspects 17-18, wherein a number of control channel monitoring skip durations within the set of control channel monitoring skip durations is based at least in part on a size of a field associated with the indication of the control channel monitoring skip duration, or wherein the size of the field associated with the indication of the control channel monitoring skip duration is based at least in part on the number of control channel monitoring skip durations within the set of control channel monitoring skip durations.

Aspect 20: The method of any of Aspects 17-19, wherein an additional set of control channel monitoring skip durations, of the multiple candidate sets of control channel monitoring skip durations, includes at least one control channel monitoring skip duration that is not within the set of control channel monitoring skip durations.

Aspect 21: The method of any of Aspects 17-20, further comprising: transmitting, before transmitting the indication of the selection of the set of control channel monitoring skip durations, an indication of the multiple candidate sets of control channel monitoring skip durations.

Aspect 22: The method of Aspect 21, wherein transmission of the indication of the multiple candidate sets of control channel monitoring skip durations comprises: transmitting the indication of the multiple candidate sets of control channel monitoring skip durations via one or more of radio resource control signaling or medium access control signaling.

Aspect 23: The method of any of Aspects 17-22, wherein transmission of the indication of the selection of the set of control channel monitoring skip durations comprises: transmitting the indication of the selection of the set of control channel monitoring skip durations via one or more of downlink control information or medium access control signaling.

Aspect 24: The method of any of Aspects 17-23, wherein the selection of the set of control channel monitoring skip durations is based at least in part on traffic characteristics associated with communication between the network node and the UE.

Aspect 25: The method of Aspect 24, wherein traffic having an average inter-arrival time that satisfies a first threshold is associated with a set of control channel monitoring skip durations having a first range of control channel monitoring skip durations, and wherein traffic having an average inter-arrival time that fails to satisfy the first threshold is associated with a set of control channel monitoring skip durations having a second range of control channel monitoring skip durations that is less than the first range of control channel monitoring skip durations.

Aspect 26: The method of any of Aspects 24-25, wherein traffic having a periodic arrival time is associated with a set of control channel monitoring skip durations configured to end within a timing threshold from a next periodic arrival time occasion.

Aspect 27: The method of any of Aspects 17-26, wherein the indication of the selection of the set of control channel monitoring skip durations applies to one or more subsequent indications of control channel monitoring skip durations based at least in part on one or more of: transmission of the one or more subsequent indications of control channel monitoring skip durations during a time window, or transmission of the one or more subsequent indications of control channel monitoring skip durations before transmitting an indication of an update to the selection of the set of control channel monitoring skip durations.

Aspect 28: The method of any of Aspects 17-27, wherein a time window during which the indication of the selection of the set of control channel monitoring skip durations applies comprises one or more of: a first beginning time that is based at least in part on a message type associated with the indication of the selection of the set of control channel monitoring skip durations, a second beginning time that is based at least in part on a delay that is based at least in part on a sub-carrier spacing associated with the control channel, a third beginning time that is based at least in part on a hybrid automatic repeat request acknowledgment feedback associated with the indication of the selection of the set of control channel monitoring skip durations, a first end time that is based at least in part on a configured duration of the time window, a second end time that is based at least in part on the indication of the selection of the set of control channel monitoring skip durations, or a third end time that is based at least in part on an indication of the multiple candidate sets of control channel monitoring skip durations.

Aspect 29: The method of any of Aspects 17-28, wherein the network node activates a previously-indicated set of control channel monitoring skip durations upon expiration of a time window during which the indication of the selection of the set of control channel monitoring skip durations applies.

Aspect 30: The method of any of Aspects 17-29, wherein the indication of the selection comprises: an explicit indication, or an implicit indication.

Aspect 31: The method of Aspect 30, wherein the implicit indication is based at least in part on one or more of: one or more parameters of a scheduled data channel, or one or more parameters of a scheduling control channel.

Aspect 32: The method of Aspect 31, wherein the one or more parameters of the scheduled data channel comprise one or more of: a hybrid automatic repeat request process identification, a time resource allocation, a frequency resource allocation, a scheduling offset, or a beamforming configuration.

Aspect 33: The method of any of Aspects 31-32, wherein the one or more parameters of the scheduling control channel comprise one or more of: a control resource set (CORESET), a search space set index, a first control channel element index in the CORESET that is mapped to the scheduling control channel, a scrambling sequence of the scheduling control channel, a demodulation reference signal associated with the scheduling control channel, a radio network temporary identification associated with the scheduling control channel, or a cyclic redundancy check associated with the scheduling control channel.

Aspect 34: An apparatus for wireless communication at a device, comprising a processor; memory coupled with the processor; and instructions stored in the memory and executable by the processor to cause the apparatus to perform the method of one or more of Aspects 1-33.

Aspect 35: A device for wireless communication, comprising a memory and one or more processors coupled to the memory, the one or more processors configured to perform the method of one or more of Aspects 1-33.

Aspect 36: An apparatus for wireless communication, comprising at least one means for performing the method of one or more of Aspects 1-33.

Aspect 37: A non-transitory computer-readable medium storing code for wireless communication, the code comprising instructions executable by a processor to perform the method of one or more of Aspects 1-33.

Aspect 38: A non-transitory computer-readable medium storing a set of instructions for wireless communication, the set of instructions comprising one or more instructions that, when executed by one or more processors of a device, cause the device to perform the method of one or more of Aspects 1-33.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by a user equipment (UE), comprising:
receiving an indication of a selection of a set of control channel monitoring skip durations, of multiple candidate sets of control channel monitoring skip durations, each candidate set of the multiple candidate sets including a respective control channel monitoring skip duration with a value that is different from values of control channel monitoring skip durations included in other candidate sets of the multiple candidate sets;
receiving an indication of a control channel monitoring skip duration of the set of control channel monitoring skip durations;
transmitting an acknowledgment of the indication of the control channel monitoring skip duration; and
refraining from monitoring a control channel during a time period associated with the control channel monitoring skip duration.

2. The method of claim 1,
wherein a number of control channel monitoring skip durations within the set of control channel monitoring skip durations is based at least in part on a size of a field associated with the indication of the control channel monitoring skip duration, or
wherein the size of the field associated with the indication of the control channel monitoring skip duration is based at least in part on the number of control channel monitoring skip durations within the set of control channel monitoring skip durations.

3. The method of claim 1,
wherein a value of the control channel monitoring skip duration is based at least in part on a type of communications for the UE.

4. The method of claim 1, further comprising:
receiving, before receiving the indication of the selection of the set of control channel monitoring skip durations, an indication of the multiple candidate sets of control channel monitoring skip durations.

5. The method of claim 4,
wherein reception of the indication of the multiple candidate sets of control channel monitoring skip durations comprises:
receiving the indication of the multiple candidate sets of control channel monitoring skip durations via one or more of radio resource control signaling or medium access control signaling.

6. The method of claim 1,
wherein reception of the indication of the selection of the set of control channel monitoring skip durations comprises:
receiving the indication of the selection of the set of control channel monitoring skip durations via one or more of downlink control information or medium access control signaling.

7. The method of claim 1,
wherein the selection of the set of control channel monitoring skip durations is based at least in part on traffic characteristics associated with communication between the UE and a network node.

8. The method of claim 7,
wherein traffic having an average inter-arrival time that satisfies a first threshold is associated with a set of control channel monitoring skip durations having a first range of control channel monitoring skip durations, and
wherein traffic having an average inter-arrival time that fails to satisfy the first threshold is associated with a set of control channel monitoring skip durations having a second range of control channel monitoring skip durations that is less than the first range of control channel monitoring skip durations.

9. The method of claim 7,
wherein traffic having a periodic arrival time is associated with a set of control channel monitoring skip durations configured to end within a timing threshold from a next periodic arrival time occasion.

10. The method of claim 1,
wherein the indication of the selection of the set of control channel monitoring skip durations applies to one or more subsequent indications of control channel monitoring skip durations based at least in part on one or more of:
reception of the one or more subsequent indications of control channel monitoring skip durations during a time window, or
reception of the one or more subsequent indications of control channel monitoring skip durations before receiving an indication of an update to the selection of the set of control channel monitoring skip durations.

11. The method of claim 1,
wherein a time window during which the indication of the selection of the set of control channel monitoring skip durations applies comprises one or more of:
a first beginning time that is based at least in part on a message type associated with the indication of the selection of the set of control channel monitoring skip durations,
a second beginning time that is based at least in part on a delay that is based at least in part on a sub-carrier spacing associated with the control channel, a third beginning time that is based at least in part on a hybrid automatic repeat request acknowledgment feedback associated with the indication of the selection of the set of control channel monitoring skip durations, a first end time that is based at least in part on a configured duration of the time window, a second end time that is based at least in part on the indication of the selection of the set of control channel monitoring skip durations, or a third end time that is based at least in part on an indication of the multiple candidate sets of control channel monitoring skip durations.

12. The method of claim 1, wherein the UE activates a previously-indicated set of control channel monitoring skip durations upon expiration of a time window during which the indication of the selection of the set of control channel monitoring skip durations applies.

13. The method of claim 1, wherein the indication of the selection comprises an implicit indication that is based at least in part on one or more of:

one or more parameters of a scheduled data channel, or one or more parameters of a scheduling control channel.

14. The method of claim 13, wherein the one or more parameters of the scheduled data channel comprise one or more of:

a hybrid automatic repeat request process identification, a time resource allocation, a frequency resource allocation, a scheduling offset, or a beamforming configuration.

15. The method of claim 13, wherein the one or more parameters of the scheduling control channel comprise one or more of:

a control resource set (CORESET), a search space set index, a first control channel element index in the CORESET that is mapped to the scheduling control channel, a scrambling sequence of the scheduling control channel, a demodulation reference signal associated with the scheduling control channel, a radio network temporary identification associated with the scheduling control channel, or a cyclic redundancy check associated with the scheduling control channel.

16. A method of wireless communication performed by a network node, comprising:

transmitting, to a user equipment (UE), an indication of a selection of a set of control channel monitoring skip durations, of multiple candidate sets of control channel monitoring skip durations, each candidate set of the multiple candidate sets including a respective control channel monitoring skip duration with a value that is different from values of control channel monitoring skip durations included in other candidate sets of the multiple candidate sets;

transmitting, to the UE, an indication of a control channel monitoring skip duration of the set of control channel monitoring skip durations; and receiving an acknowledgment of the indication of the control channel monitoring skip duration.

17. The method of claim 16, further comprising:

refraining from transmitting a control channel communication during a time period associated with the control channel monitoring skip duration.

18. The method of claim 16, wherein a number of control channel monitoring skip durations within the set of control channel monitoring skip durations is based at least in part on a size of a field associated with the indication of the control channel monitoring skip duration, or wherein the size of the field associated with the indication of the control channel monitoring skip duration is based at least in part on the number of control channel monitoring skip durations within the set of control channel monitoring skip durations.

19. The method of claim 16, further comprising:

transmitting, before transmitting the indication of the selection of the set of control channel monitoring skip durations, an indication of the multiple candidate sets of control channel monitoring skip durations.

20. The method of claim 16, wherein the selection of the set of control channel monitoring skip durations is based at least in part on traffic characteristics associated with communication between the network node and the UE.

21. The method of claim 20, wherein traffic having an average inter-arrival time that satisfies a first threshold is associated with a set of control channel monitoring skip durations having a first range of control channel monitoring skip durations, and wherein traffic having an average inter-arrival time that fails to satisfy the first threshold is associated with a set of control channel monitoring skip durations having a second range of control channel monitoring skip durations that is less than the first range of control channel monitoring skip durations.

22. The method of claim 20, wherein traffic having a periodic arrival time is associated with a set of control channel monitoring skip durations configured to end within a timing threshold from a next periodic arrival time occasion.

23. The method of claim 16, wherein the indication of the selection of the set of control channel monitoring skip durations applies to one or more subsequent indications of control channel monitoring skip durations based at least in part on one or more of:

transmission of the one or more subsequent indications of control channel monitoring skip durations during a time window, or transmission of the one or more subsequent indications of control channel monitoring skip durations before transmitting an indication of an update to the selection of the set of control channel monitoring skip durations.

24. The method of claim 16, wherein a time window during which the indication of the selection of the set of control channel monitoring skip durations applies comprises one or more of:

a first beginning time that is based at least in part on a message type associated with the indication of the selection of the set of control channel monitoring skip durations, a second beginning time that is based at least in part on a delay that is based at least in part on a sub-carrier spacing associated with the control channel, a third beginning time that is based at least in part on a hybrid automatic repeat request acknowledgment feedback associated with the indication of the selection of the set of control channel monitoring skip durations, a first end time that is based at least in part on a configured duration of the time window, a second end time that is based at least in part on the indication of the selection of the set of control channel monitoring skip durations, or a third end time that is based at least in part on an indication of the multiple candidate sets of control channel monitoring skip durations.

25. The method of claim 16, wherein the network node activates a previously-indicated set of control channel monitoring skip durations upon expiration of a time window during which the indication of the selection of the set of control channel monitoring skip durations applies.

26. The method of claim 16, wherein the indication of the selection comprises an implicit indication that is based at least in part on one or more of:

one or more parameters of a scheduled data channel, or one or more parameters of a scheduling control channel.

27. The method of claim 26, wherein the one or more parameters of the scheduled data channel comprise one or more of:

a hybrid automatic repeat request process identification, a time resource allocation, a frequency resource allocation, a scheduling offset, or a beamforming configuration.

28. The method of claim 26, wherein the one or more parameters of the scheduling control channel comprise one or more of:

a control resource set (CORESET), a search space set index, a first control channel element index in the CORESET that is mapped to the scheduling control channel, a scrambling sequence of the scheduling control channel, a demodulation reference signal associated with the scheduling control channel, a radio network temporary identification associated with the scheduling control channel, or a cyclic redundancy check associated with the scheduling control channel.

29. A user equipment (UE) for wireless communication, comprising:

one or more memories; and one or more processors, coupled to the one or more memories, configured to:

receive an indication of a selection of a set of control channel monitoring skip durations, of multiple candidate sets of control channel monitoring skip durations, each candidate set of the multiple candidate sets including a respective control channel monitoring skip duration with a value that is different from values of control channel monitoring skip durations included in other candidate sets of the multiple candidate sets;

receive an indication of a control channel monitoring skip duration of the set of control channel monitoring skip durations;

transmit an acknowledgment of the indication of the control channel monitoring skip duration; and refrain from monitoring a control channel during a time period associated with the control channel monitoring skip duration.

30. A network node for wireless communication, comprising:

one or more memories; and one or more processors, coupled to the one or more memories, configured to:

transmit, to a user equipment (UE), an indication of a selection of a set of control channel monitoring skip durations, of multiple candidate sets of control channel monitoring skip durations, each candidate set of the multiple candidate sets including a respective control channel monitoring skip duration with a value that is different from values of control channel monitoring skip durations included in other candidate sets of the multiple candidate sets;

transmit, to the UE, an indication of a control channel monitoring skip duration of the set of control channel monitoring skip durations; and receive an acknowledgment of the indication of the control channel monitoring skip duration.

* * * * *